Patented May 22, 1945

2,376,533

UNITED STATES PATENT OFFICE 2,376,533

MANUFACTURE OF STYRENE

Gustav Egloff, Chicago, Ill., assignor to Universal Oil Products Company, Chicago, Ill., a corporation of Delaware No Drawing. Application February 11, 1942, Serial No. 430,484

5 Claims. (Cl. 260—669)

This invention relates to a process for the production of alkene aromatics by reacting alkynes with aromatics in the presence of a catalyst. More specifically, it is concerned with the production of styrene by the alkylation of benzene with acetylene in the presence of a siliceous catalyst.

It has been found that a very durable synthetic rubber may be produced by interacting butadiene with alkene aromatic compounds of a type in which the double bond in the side chain is in a conjugate position relative to the double bonds of the aromatic nucleus. Of the alkene aromatics that have been found to be particularly suitable for such a copolymerization reaction with butadiene, styrene has been found to be the cheapest and the most practical. The production of styrene is, therefore, of paramount importance at the present time.

I have found that higher yields of styrene may be produced by the alkylation of benzene with acetylene in the presence of a siliceous type catalyst under certain conditions of temperature, ratio of reactants and contact time, and I propose, therefore, to manufacture styrene in this manner.

In one specific embodiment, the present invention relates to a process for the production of styrene and other alkene aromatics by subjecting acetylene and benzene to contact with a siliceous type catalyst at a temperature in the approximate range of from 200 to 650° C., an excess of benzene being continuously maintained throughout the reaction period for a sufficient contact time to effect the formation of styrene, thereafter separating the styrene from the unconverted materials and from other products of reaction.

The preferred catalysts for the present operation comprise associations of silica and alumina either obtained from natural sources or which are prepared synthetically. Of the naturally occurring substances, the hydrosilicates of alumina, acid treated clays such as a commercial product known as Super-Filtrol, and the like have been found to be quite effective. Preferably, however, the synthetic catalysts are employed since these catalysts are not only more active in promoting the alkylation reaction, but are also more thermally stable than the naturally occurring catalysts and are therefore able to withstand higher temperatures. The synthetic catalysts comprise in general a calcined composite of silica hydrogel together with at least one compound selected from the group consisting of alumina hydrogel and zirconia hydrogel. These catalysts may be prepared, for example, by compositing the purified hydrogels in order to form a homogeneous material followed by shaping of the catalyst if desired, and drying or calcination of the resultant mass at temperatures of from 200 to 800° C. In case a powdered catalyst is to be employed, shaping or pelleting operations will, of course, be omitted.

In conducting the process, any one of several methods of contacting the hydrocarbons with the catalyst may be employed. For example, the pelleted catalyst may be arranged in a fixed bed and the hydrocarbons passed through the bed at the proper rate to effect the desired conversion. According to another method, the catalyst powder may be combined with a charging material and the resultant suspension passed through a heating coil under the desired conditions of temperature and pressure. According to a third method of operation, the reactants are passed up through a bed of powdered catalyst at the proper rate so that the powdered catalyst is maintained in a turbulent suspension.

The activity of the catalyst which is used in this operation gradually decreases as the given reaction period progresses inasmuch as a carbonaceous material is continuously deposited on the surface of the catalyst. For this reason, it is necessary to regenerate the catalyst at frequent intervals in order to restore its activity. In the case of the fixed bed operation, the flow of hydrocarbons may be intermittently interrupted and oxygen containing gases contacted with the catalyst, thereby removing the deposit by a process of combustion. In case powdered catalyst is employed, it may be continuously removed from the reaction zone or from the products of reaction, continuously regenerated by contact with an oxygen containing gas and continuously supplied back to the conversion zone for further use. It is also possible to regenerate the powdered catalyst in the turbulent bed process previously mentioned by interrupting the flow of hydrocarbons and contacting the catalyst with an oxygen containing gas.

In order to reduce the proportions of acetylene and styrene which enter into undesirable side reactions, it is usually desirable to maintain a considerable excess of benzene over that stoichiometrically required by the theoretical equation, as well as to effect a relatively low conversion per pass of benzene to styrene. It is desirable, for example, to maintain a benzene to acetylene mol ratio in excess of about 5 to 1 since, in this way, copolymerization of the acetylene is reduced.

Operating conditions within the reaction zone will ordinarily be within the range of from about 200 to about 650° C. depending to a large extent upon the type of catalyst employed, upon the conversion per pass that is desired, and upon the benzene to acetylene mol ratio. The pressure may also vary considerably, being in the range of from only slightly super-atmospheric to 1000 pounds or more per square inch. It is preferred, however, to employ temperatures within the range of from about 350 to 500° C. and pressures within the range of from approximately 100 to 600 pounds per square inch. Relatively short times of contact are usually employed, to reduce the extent of decomposition of the styrene.

The separation of the products may be effected by a variety of processes such as, for example, by a combination of low temperature distillation and solvent extraction, and the like.

The following example illustrates the type of operating conditions that may be employed in producing styrene from a benzene-acetylene mixture.

Example

Benzene and acetylene in a molal ratio of approximately 20 to 1 are combined and heated to a temperature of approximately 500° C. and are thereafter supplied to contact with a silica alumina catalyst at a pressure of approximately 400 pounds per square inch. The products of reaction are removed from the reaction zone and immediately quenched to room temperature in order to prevent further reaction. A substantial proportion of the acetylene is removed from the reaction products by an atmospheric distillation. The acetylene free mixture is then separated into a benzene fraction and a styrene fraction by a low temperature fractionation process combined with a solvent extraction step to purify the styrene.

I claim:

1. A process for producing alkene aromatics which comprises reacting an acetylenic hydrocarbon with an aromatic nucleus in the presence of a catalyst comprising a calcined mixture of the hydrogels of silica and alumina at a temperature of from 200 to 650° in the approximate range of the aromatic being employed C., an excess of the aromatic required for the reaction over that stoichiometrically of one mol of the aromatic hydrocarbon with one mol of the acetylenic hydrocarbon.

2. A process for the production of alkene aromatics having a double bond in the side chain in a conjugated position relative to the double bonds of the aromatic nucleus which comprises reacting an acetylenic hydrocarbon with an aromatic nucleus in the presence of a catalyst comprising a calcined mixture of the hydrogels of silica and alumina at a temperature in the approximate range of from 200 to 650° C., an excess of the aromatic being employed over that stoichiometrically required for the reaction of one mol of the aromatic hydrocarbon with one mol of the acetylenic hydrocarbon.

3. A process for the manufacture of styrene from benzene and acetylene which comprises contacting benzene and acetylene with a catalyst comprising a calcined mixture of the hydrogels of silica and alumina at a temperature ranging from approximately 200 to 650° C. for a period of time sufficient to effect the formation of substantial yields of styrene, maintaining throughout the entire reaction period an excess of benzene over that stoichiometrically required for the interaction of one mol of benzene with one mol of acetylene.

4. A process for the manufacture of styrene from benzene and acetylene which comprises contacting benzene and acetylene with a catalyst comprising silica hydrogel composited with at least one oxide hydrogel selected from the group consisting of alumina hydrogel and zirconia hydrogel at a temperature within the approximate range of from 200° C. to 650° C. to produce styrene, and maintaining throughout the entire reaction period a stoichiometric excess of benzene over that required for the interaction of one mol of benzene with one mol of acetylene.

5. A process for the manufacture of styrene from benzene and acetylene which comprises contacting benzene and acetylene with a catalyst comprising silica hydrogel composited with at least one oxide hydrogel selected from the group consisting of alumina hydrogel and zirconia hydrogel at a temperature within the approximate range of from 200° C. to 650° C. to produce styrene, and maintaining throughout the entire reaction period a molal ratio of benzene to acetylene in excess of about 5 to 1.

GUSTAV EGLOFF.